Figure 1:
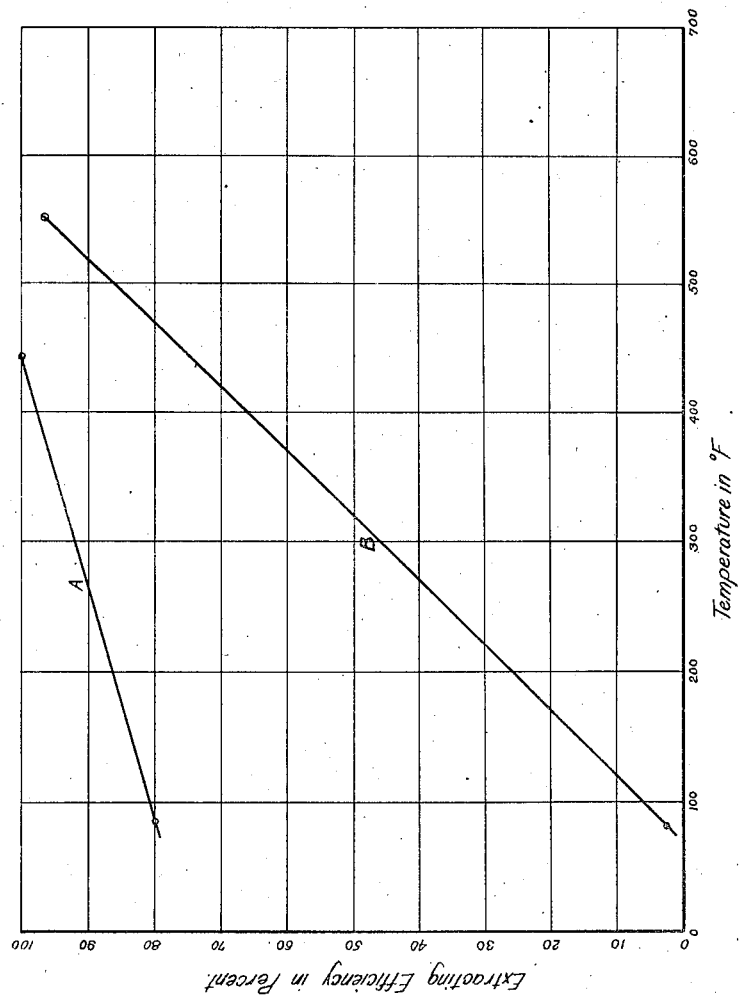

Aug. 13, 1929.  W. M. STRATFORD  1,724,531
REVIVIFYING ADSORBENT MATERIALS
Filed Feb. 11, 1925  2 Sheets-Sheet 1

Inventor
William M. Stratford
By his Attorney
R. J. Dearborn

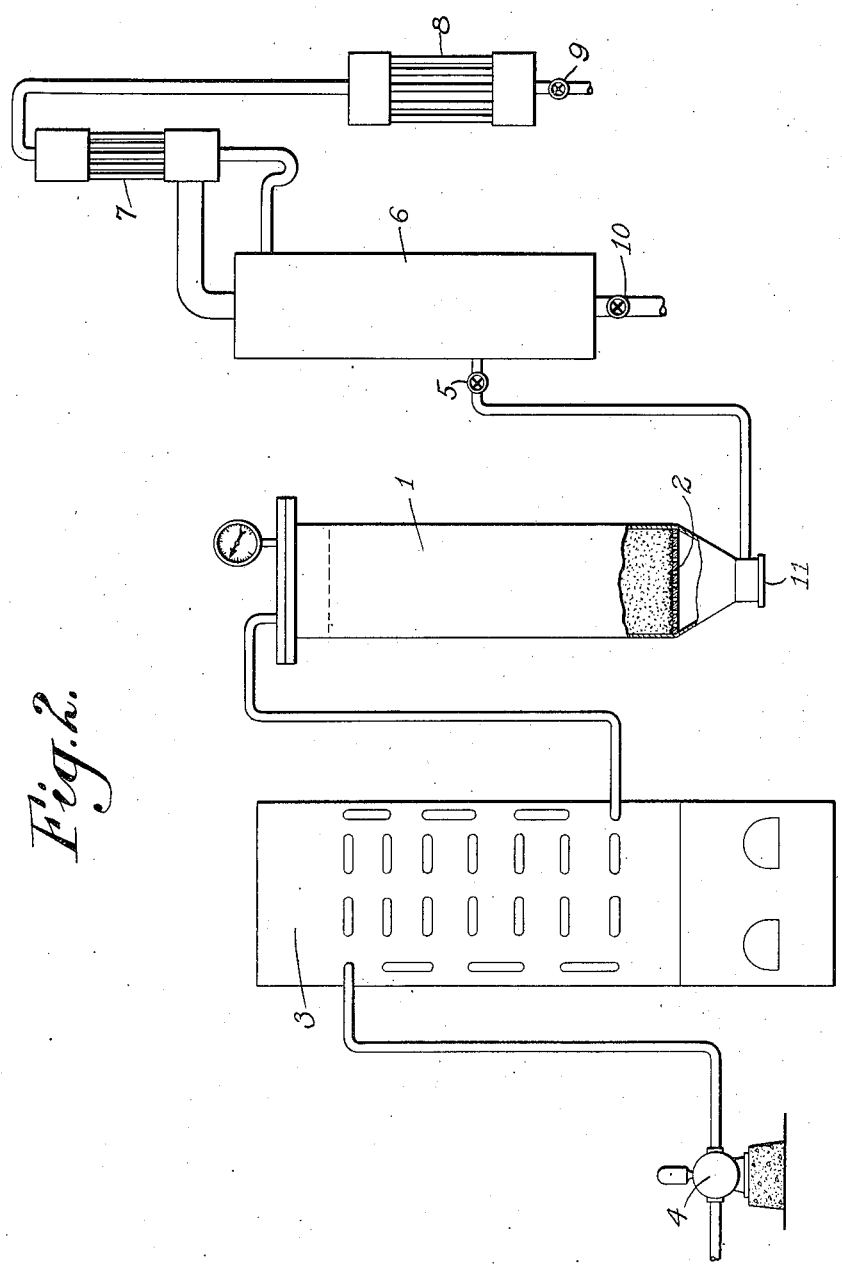

Patented Aug. 13, 1929.

1,724,531

UNITED STATES PATENT OFFICE.

WILLIAM M. STRATFORD, OF PORT ARTHUR, TEXAS, ASSIGNOR TO THE TEXAS COMPANY, OF NEW YORK, N. Y., A CORPORATION OF TEXAS.

REVIVIFYING ADSORBENT MATERIALS.

Application filed February 11, 1925. Serial No. 8,334.

This invention relates to methods of treating fuller's earth or clays or equivalent adsorbent material which has been used in decolorizing hydrocarbon oils and contemplates a process of removing adsorbed coloring matter and oil from the pores of the clay and the restoration of the adsorbent and decolorizing qualities of the clay.

It is generally recognized that the coloring element in hydrocarbon oils consists of asphalt-like material in colloidal form and when filtering these oils to improve the color thereof the colloidal asphalt is adsorbed on the surface and in the pores of the filtering medium. For example, United States Letters Patent No. 1,112,650 to Charles L. Parsons, issued October 6, 1914, describes the adsorption and removal of impurities, including coloring matter, from oils by means of fuller's earth. United States Letters Patent No. 1,340,889 to Thomas T. Gray, issued May 25, 1920, describes the deposition of an asphaltic or resinous deposit upon fuller's earth used in refining oils in vapor form. In common practice the adsorptive clays generally referred to as fuller's earth which have been used in filtering petroleum oils are subjected to a treatment in which the clay is charged into a direct fired rotary kiln and in contact with the gases of combustion. The coloring matter adsorbed from the oil and contained within the pores of the clay is partially removed by a combined distillation and oxidation but the decolorizing efficiency of the clay thus treated is considerably less than its original efficiency due to a partial carbonization of the asphaltic material within the pores, thus reducing their size and also reducing the active surface of the filtering medium. Therefore, after several recoveries, the clay has so deteriorated as to be of no further use in decolorizing oil.

While the method of heating or burning which has just been described is used to a large extent on the usual types of fuller's earth, such as that obtained in Florida and known as Floridin, it is entirely unsatisfactory on certain other types of clays. For example, there has been recently developed a type of decolorizing clay which has no natural decolorizing power but which will, when treated with acid, develop an active structure so that the treated clay may prove to be four to five times as efficient as ordinary fuller's earth. Certain clays of this type are so constituted that the degree of heat usually applied in recovery operations will practically destroy the structure of the clay and render it worthless for decolorizing and refining hydrocarbon oils.

The revivification of decolorizing clays may be accomplished with much greater efficiency by dissolving out the adsorbed coloring matter by means of a solvent which has no harmful effect upon the structure of the clay itself. However, the power of dissolving such substances is not common to all types of solvents of asphaltic material but is specific to a class of solvents which I will designate as extracting solvents. Thus, for example, acetone is a fairly efficient extracting solvent and by washing spent fuller's earth repeatedly with this material the asphalt-like coloring material may be substantially removed and the clay so treated will be revivified to approximately its initial efficiency. On the other hand, should a light fraction of petroleum such as naphtha be used to wash the clay, the quantity of coloring matter extracted and the degree of revivification obtained will be negligible. However, on separating the acetone from the asphaltic material which has been extracted, it may be shown that a large portion of this extracted substance is soluble in naphtha.

This example has been given to point out the importance of what I have termed an extracting solvent as distinguished from a non-extracting solvent and to emphasize the fact that all solvents of coloring matter or of asphalt will not extract such substances from the pores of adsorbent materials. The reason for such phenomena is not definitely known but a reasonable theory suggests that the asphalt-like materials dissolve in the extracting solvents in the form of true solutions and are not readily adsorbed therefrom while in the non-extracting solvents the apparent solution of the asphaltic matter is really a dispersion in colloidal form and in such colloidal solution adsorption takes place more readily. Whatever the true explanation may be, experiments have shown that certain solvents such as alcohols, ketones and like oxygen-containing carbon compounds are excellent extracting solvents to be used in revivifying spent fuller's earth while other well-known solvents such as gasoline, benzol, and hydrocarbons in general, are not extracting solvents in this sense.

It might seem then that the preferable method of revivification of spent fuller's earth would consist in treating the earth with an extracting solvent. However, the known extracting solvents belong to the more expensive class, and therefore, due to the unavoidable loss of solvent during treatment and handling of the clay, recovery by this method is so expensive that it has not to any great extent replaced the usual burning process except in special instances.

I have discovered that materials which are normally non-extracting solvents may, under the influence of heat, be made to function as extracting solvents. It may be that the temperatures most suitable for extraction will be above the normal boiling point of the solvent, in which case the solvent may be maintained in substantially liquid form by carrying on the process under suitable superatmospheric pressure. For example, I may treat spent fuller's earth with petroleum naphtha at temperatures up to its normal boiling point but the quantity of adsorbed coloring matter removed and the degree of revivification obtained will be negligible from a practical standpoint. However, by the practice of my invention, I may treat the same or similar decolorizing clay with naphtha at temperatures in the neighborhood of 600° F. and under pressures from 150–500 pounds per square inch or more, thus keeping the naphtha substantially in the liquid state, and extract therefrom a large portion of the adsorbed coloring material and effect revivification of the clay to a degree approaching its original efficiency.

As a further example, the revivification of a spent decolorizing clay with an extracting solvent such as acetone may be greatly facilitated by carrying out the extraction at elevated temperatures and such pressure as is required to maintain the solvent in the liquid state. Whereas under normal conditions the clay must be washed repeatedly with acetone to effect revivification, if the process is carried out at relatively high temperatures the time of washing and extracting is greatly shortened, resulting in a much more economical recovery of the filtering material.

The exact reason for this increase in extracting efficiency of extracting solvents and the transformation of non-extracting to extracting solvents by increased temperatures is not known. However, it is suggested that there may be several effects produced by the increased temperatures. It may be that the coloring material which tends to form colloidal solutions at low temperatures may dissolve in the form of a true solution at elevated temperatures. Another effect of increased temperature may be to lessen the adsorbing effect or attraction between the molecules of coloring material and the surface of the clay. This latter effect is probably of the most importance. Experiments have shown that in decolorizing hydrocarbon oils, there is a temperature of maximum efficiency for each type of clay or adsorbent material. For example, ordinary fuller's earth may be most efficient at temperatures in the neighborhood of 100° F. whereas certain clays, both naturally occurring and artificially prepared, may exhibit their greatest decolorizing efficiency at 250°–300° F. and it is advantageous to carry out the revivification of clays by means of solvents at temperatures in excess of the temperature of the maximum decoloring efficiency of the clay.

In order that the invention may be more fully understood, reference may be had to the accompanying drawing, Figure 1, where the effect of incrased temperature on the extracting qualities of different types of solvents is represented graphically. The curves are plotted with percent extracting efficiency as ordinates and temperature in degrees Fahrenheit as abscissa. "A" represents the extracting efficiency of a well-known extracting solvent from ordinary room temperature up to the region of its critical temperature. The point of one hundred percent efficiency is arbitrarily taken at the approximate critical temperature of this solvent. "B" represents the extracting efficiency of a usual type of non-extracting solvent. It is readily seen that at 80° F. the efficiency of the non-extracting solvent is negligible from a practical standpoint whereas the extracting solvent has at this temperature an efficiency of over eighty percent. The marked effect of temperatures upon the non-extracting solvent is shown by the fact that at 440° F., the approximate critical temperature of the extracting solvent, the non-extracting solvent has increased in efficiency by approximately seventy-five percent, while in the region of its own critical temperature the non-extracting solvent approaches an efficiency of one hundred percent.

In the practice of the invention it will be found that the individual characteristics of the clay which is to be revivified and the oil upon which the clay has been used will effect to a considerable degree the efficiency of different solvents and therefore the curves as shown in the drawing are merely relative and are submitted only for the purpose of illustration.

In order to more fully disclose the application of my invention I will now describe in detail a preferred method of operation. Adsorbent material which has been used in decolorizing hydrocarbon oil, for example fuller's earth, may be first treated to remove oil by washing with an oil solvent or by steaming or by a combination of treatment with oil solvent and steam. The clay is then charged into a vessel where it is treated with gasoline or benzol or the like while under the influence of heat. I may use any of the various well-known solvents of this type but I prefer to use gasoline or benzol because of their cheapness. I have found that in general the higher the temperature used the more efficient the revivification but this temperature is limited by several factors among which may be mentioned: 1. The critical temperature of the solvent must not be exceeded in order that it be maintained in substantially liquid form: 2. Cracking due to overheating, with consequent deposition of carbon upon the filtering medium is to be avoided.

A preferred form of apparatus for practicing the invention is illustrated diagrammatically in the accompanying drawing, Figure II, wherein 1 is a strongly constructed and heavily insulated treating vessel in which the spent clay is placed, resting upon the perforated plate 2 upon which is placed a wire cloth or similar material. Solvent is supplied from a source (not shown) by the pump 4 to the preheater 3 where it is heated to the temperature best suited for the practice of the invention. Pressure is maintained upon 1 and 3 so as to avoid excessive vaporization of the solvent. The solvent is passed through the bed of clay contained in 1 from which it dissolves and extracts the adsorbed coloring matter and any oil contained therein and is then expanded at reduced pressure through the valve 5 into the fractionating column 6 where vaporization and distillation take place. The heavy non-volatile coloring matter and oil are withdrawn from the lower portion of the column at 10 while the purified solvent passes through the reflux condenser 7 and the condenser 8 and may then be returned to the preheater to be used in further extraction. Circulation of the solvent is continued until no further extraction is accomplished after which the solvent may be drained from the clay and final traces removed by blowing with steam. The clay is then allowed to cool and is discharged through 10 to be again used in decolorizing operations.

While the invention has been described chiefly in connection with the revivification of spent clays, it is to be understood that it is not limited in its application to clays alone but may be applied with equal advantage to absorbent carbons, mineral gels and the like which may be used in refining hydrocarbon oils.

Obviously many modifications and variations of the invention as hereinbefore set forth may be made without departing from the spirit and scope thereof, and therefore, only such limitations should be imposed as are indicated in the appended claims.

I claim:

1. The process of eliminating adsorbed carbonaceous materials from adsorbent material spent in refining hydrocarbon oil which comprises forcing a heated solvent under pressure through a body of said adsorbent material.

2. The process of revivifying spent decolorizing clay which has been used in refining hydrocarbon oil, which comprises contacting the clay with a substantially non-aqueous solvent at temperatures above the normal boiling range of the solvent and under pressures in excess of the vapor pressure of the solvent at the temperature of contacting, and then separating the solvent and the revivified clay.

3. The process of revivifying spent decolorizing clay which has been used in refining hydrocarbon oil, which comprises contacting the clay with a substantially non-aqueous solvent under the influence of heat and under superatmospheric pressure, and then separating the solvent and the revivified clay.

4. The process of revivifying adsorbent material which has been used in refining hydrocarbon oil, which comprises contacting the material with a volatile liquid hydrocarbon solvent under the influence of heat and pressure to effect the extraction of absorbed carbonaceous matter, and then separating the solvent and the adsorbent material.

5. In the process of revivifying adsorbent material spent in refining hydrocarbon oil, the step which comprises contacting the adsorbent material with a solvent, which under normal conditions of temperature and pressure has substantially no revivifying properties, at temperatures above the normal boiling range of the solvent and under sufficient pressure to maintain the solvent in a substantially liquid condition, to effect the extraction of absorbed carbonaceous matter.

6. The process of revivifying adsorbent material spent in refining hydrocarbon oil, which comprises extracting adsorbed carbonaceous material therefrom by forcing a heated solvent under pressure through a body of the adsorbent material, separating the solvent from the extracted material, and introducing the hot solvent into a vessel maintained under reduced pressure to effect distillation of the solvent.

7. In the process of revivifying adsorbent material spent in refining hydrocarbon oil, the step which comprises contacting the adsorbent material with gasoline at temperatures above the normal boiling range of the gasoline and under sufficient pressure to maintain it in substantially liquid condition to effect the extraction of the absorbed carbonaceous matter.

In witness whereof I have hereunto set my hand this 2nd day of February, 1925.

WILLIAM M. STRATFORD.